W. T. Shannon,
Fly Trap,
Nº 17,811. Patented July 14, 1857.
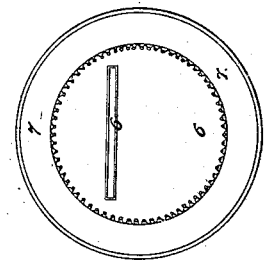
Bottom View of Plate & Bag.
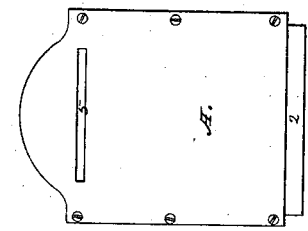
Rib View of Box.
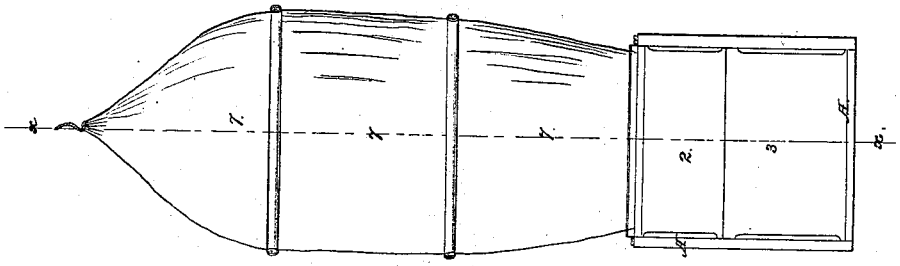
Front Elevation.
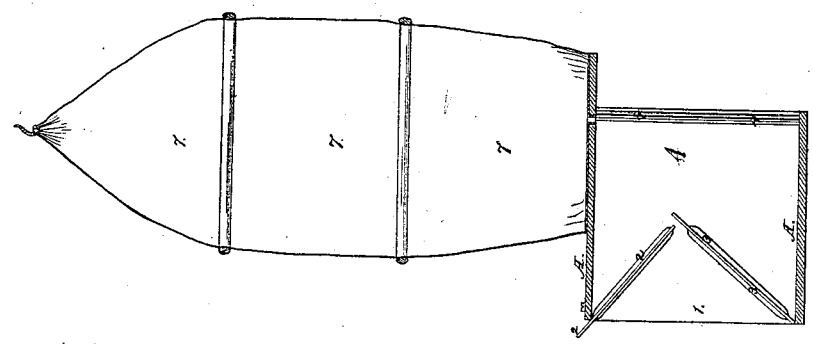
Vertical Section at x.x.

UNITED STATES PATENT OFFICE.

WILLIAM T. SHANNON, OF GREENSBORO, GEORGIA.

FLY-TRAP.

Specification of Letters Patent No. 17,811, dated July 14, 1857.

*To all whom it may concern:*

Be it known that I, WILLIAM T. SHANNON, of the city of Greensboro, and county of Greene, and State of Georgia, have invented a new and Improved Mode of Catching Flies and Destroying the Same; and I do hereby declare that the following is a full and exact description thereof, reference being had to the accompanying drawing and to the letters, &c., of reference marked thereon.

The nature of my invention consists in the arrangement of a box A, A, of convenient size, with two inclined planes of glass, Figures 2 and 3, placed in the front part of the box, Fig. 1 being the entrance for the flies, and a perpendicular or inclined plane of glass, Fig. 4, in the back part of the box, and a hole in the top of the box, Fig. 5, over which is placed a tin plate Fig. 6, with a funnel attached to enter the hole in the top of the box. This plate is perforated on the edges, to which is secured a net or bag formed of gauze or muslin, Fig. 7, open at the upper end but tied with a string. The box thus arranged is placed in the window of the room where the flies are. The room is then darkened in any convenient way. The bag being distended by small hoops is raised up and supported by a string from the upper end attached to a nail or hook on the outside of the room. The flies go toward the light, which enters through the box. They come against the inclined planes of glass in the front part of the box, pass on to the entrance and enter the box, from which they ascend into the bag through the funnel, Fig. 5, into the bag, Fig. 7. When desired the tin plate with the bag is lifted off, and the funnel closed in any convenient way; the whole is immersed in warm or hot water, and the flies are thus effectually destroyed.

What I claim as my invention and desire to secure by Letters Patent, is—

The invention of the box above described and the bag and its attachment to the box for the purposes heretofore named.

WILLIAM T. SHANNON.

Witnesses:
ROBERT LOGAN,
JNO. H. SNELLINGS.